United States Patent
Gorecki et al.

(10) Patent No.: US 10,427,973 B2
(45) Date of Patent: Oct. 1, 2019

(54) PYROLYTIC HYBRID ENAMEL

(71) Applicant: Ferro Corporation, Mayfield Heights, OH (US)

(72) Inventors: Andrew Gorecki, Brunswick, OH (US); Charles A. Baldwin, Brooklyn, OH (US); Brad Devine, Olmsted Township, OH (US); Albert L. Benford, Jr., Bedford, OH (US); Ralph Villoni, Conneaut, OH (US); Karine Sarrazy, Saint-Dizier (FR); Alain Aronica, Saint-Dizier (FR); Teddy Colombe, Saint-Dizier (FR); Angélique Leseur, Lentilles (FR)

(73) Assignee: Ferro Corporation, Mayfield Heights, OH (US)

( * ) Notice: Subject to any disclaimer, the term of this patent is extended or adjusted under 35 U.S.C. 154(b) by 0 days.

(21) Appl. No.: 15/580,321

(22) PCT Filed: Aug. 26, 2016

(86) PCT No.: PCT/US2016/048844
§ 371 (c)(1),
(2) Date: Dec. 7, 2017

(87) PCT Pub. No.: WO2017/058418
PCT Pub. Date: Apr. 6, 2017

(65) Prior Publication Data
US 2018/0170797 A1    Jun. 21, 2018

Related U.S. Application Data

(60) Provisional application No. 62/233,471, filed on Sep. 28, 2015.

(51) Int. Cl.
| C03C 8/08 | (2006.01) |
| C03C 8/04 | (2006.01) |
| C03C 8/22 | (2006.01) |
| C23D 5/00 | (2006.01) |
| C03C 4/00 | (2006.01) |
| C03C 8/14 | (2006.01) |
| F24C 15/00 | (2006.01) |
| C03C 3/062 | (2006.01) |
| C03C 3/064 | (2006.01) |
| C03C 4/02 | (2006.01) |

(52) U.S. Cl.
CPC .............. *C03C 8/08* (2013.01); *C03C 3/062* (2013.01); *C03C 3/064* (2013.01); *C03C 4/00* (2013.01); *C03C 4/02* (2013.01); *C03C 8/04* (2013.01); *C03C 8/14* (2013.01); *C03C 8/22* (2013.01); *C23D 5/00* (2013.01); *F24C 15/005* (2013.01); *C03C 2205/04* (2013.01)

(58) Field of Classification Search
CPC ............. C03C 8/06; C03C 8/08; A47J 36/025
See application file for complete search history.

(56) References Cited

U.S. PATENT DOCUMENTS

| 2,608,490 | A | 8/1952 | Donahey |
| 2,866,713 | A | 12/1958 | Allen |
| 4,084,975 | A | 4/1978 | Faust |
| 4,110,487 | A | 8/1978 | Rion |
| 5,002,903 | A | 3/1991 | Lim et al. |
| 6,001,494 | A | 12/1999 | Kuchinski et al. |
| 6,004,894 | A | 12/1999 | Faust et al. |
| 6,429,161 | B1 | 8/2002 | Souchard et al. |
| 6,475,939 | B1 | 11/2002 | Souchard et al. |
| 6,511,931 | B1 | 1/2003 | Baldwin |
| 6,566,289 | B2 | 5/2003 | Aronica et al. |
| 6,638,600 | B2 | 10/2003 | Gazo et al. |
| 6,831,027 | B2 | 12/2004 | Gazo |
| 6,896,934 | B2 | 5/2005 | Aronica et al. |
| 7,005,396 | B2 | 2/2006 | Espargillière et al. |
| 7,244,502 | B2 | 7/2007 | Aronica et al. |
| 7,695,831 | B2 | 4/2010 | Shon et al. |
| 7,763,557 | B2 | 7/2010 | Baldwin et al. |
| 8,778,455 | B2 | 7/2014 | Benford, Jr. et al. |
| 9,072,400 | B2 | 7/2015 | Benford, Jr. et al. |
| 2009/0311514 | A1* | 12/2009 | Shon ................. C03C 8/08 428/325 |

FOREIGN PATENT DOCUMENTS

| EP | 0453897 A1 | 10/1991 |
| GB | 697827 | 9/1953 |
| GB | 718132 | 11/1954 |
| GB | 894328 | 4/1962 |
| JP | 61-281043 A | 12/1986 |

OTHER PUBLICATIONS

Machine translation of JP61-281043 published Dec. 11, 1986, five pages.
Espacenet bibliographic data for EP0453897 published Oct. 30, 1991, one page.
International Search Report for corresponding PCT/US2016/048844 dated Nov. 24, 2016, one page.

* cited by examiner

*Primary Examiner* — Karl E Group
(74) *Attorney, Agent, or Firm* — Rankin, Hill & Clark LLP

(57) ABSTRACT

A fired hybrid enamel coating is provided. The hybrid enamel coating is formed by firing an enamel composition on a substrate. The enamel composition includes at least a first glass frit, which is sintered to form the hybrid enamel coating. The hybrid enamel coating can be cleaned using aqualytic or pyrolytic cleaning methods, and does not discolor or lose gloss when subject to typical pyrolytic cleaning methods. The hybrid enamel coating does not require the application of highly caustic cleaners to remove the baked-on soils.

13 Claims, No Drawings

PYROLYTIC HYBRID ENAMEL

FIELD

The present subject matter relates to a hybrid enamel top coating for substrates, which can be cleaned with water, by pyrolysis, or a combination of water and pyrolysis to remove baked-on soils. The hybrid enamel coating does not require the application of highly caustic cleaners to remove the baked-on soils and the coating can be subject to typical pyrolytic cleaning temperatures without degrading.

BACKGROUND

An oven can be one of the most difficult kitchen appliances to clean. Food that splatters onto the interior surfaces of the oven during cooking usually becomes baked-on, making the removal thereof particularly difficult. If interior surfaces of the oven are not regularly cleaned, the amount of baked-on food can build up rapidly, thereby making subsequent cleanings more difficult.

There are several known methods for facilitating the removal of baked-on food and soils from the interior surfaces of ovens. The most widely used cleaning methods involve pyrolysis of the baked-on soils (pyrolytic cleaning), the application heated water or steam to the baked-on soils (aqualytic cleaning or aqualysis), or the application of highly alkaline chemical oven cleaners to the baked-on soil (chemical cleaning). Although these known methods are relatively effective for removing baked-on food from the interior surfaces of ovens, they present several disadvantages.

Pyrolytic cleaning of ovens typically involves heating the interior of the oven to temperatures of about 480-500° C., or about 900-930° F., for several hours. Many ovens feature a high-temperature self-cleaning cycle, during which baked-on foods are pyrolyzed (i.e. decomposed) to carbon ash residue that can be wiped from the interior surfaces of the oven once it cools. To be effective, such pyrolytic heating cycles must maintain the temperature within the oven cavity above about 480° C. (900° F.) for a period of approximately 60-180 minutes (1 to 3 hours), during which time the ovens are often automatically locked and cannot be opened.

A number of disadvantages associated with pyrolytic cleaning include the amount of time required for proceeding through a pyrolytic cleaning cycle, which can extend up to about three hours. There is also a tendency for the porcelain enamels applied to the interior surfaces of ovens to craze, and in some cases flake off when they are repeatedly exposed to such elevated temperatures. Moreover, ovens having pyrolytic heating cycles are more expensive to manufacture than conventional ovens due to the need for extra insulation and automatic door locking features. Furthermore, such ovens are more expensive to operate than conventional ovens because much power is used to generate and maintain the high temperatures during the pyrolytic heating cycle. Such ovens can also present safety concerns because the exterior surfaces of the oven can become quite hot during the pyrolytic heating cycle.

One lower-temperature pyrolytic method for removing baked-on soil from the interior surfaces of ovens is referred to as catalytic cleaning, and involves the use of catalytic enamel compositions formed on the interior surfaces of ovens. Catalytic enamel compositions, such as the composition disclosed in Faust, U.S. Pat. No. 4,084,975, typically have a porous surface and contain a substantial quantity of metallic oxides that can catalyze the oxidation of food material that is spilled or spattered on the surface of the enamel. In operation, food material is absorbed into the porous enamel surface where the catalytic metallic oxides catalyze oxidation of the food material at a substantially lower temperature (e.g. around normal cooking temperatures of 300-400° F.) than is required for pyrolytic enamels.

One disadvantage of using catalytic enamels on the interior surfaces of ovens is that the pores in the enamel can rapidly become clogged and saturated with food material, which significantly diminishes the ease with which the enamel can be cleaned. Furthermore, because the surface of a catalytic enamel coating is porous, it is readily subject to staining.

Chemical cleaning methods involving the use of oven cleaners also presents several disadvantages. Specifically, these types of cleaners include significant quantities of caustics, such as sodium hydroxide and/or potassium hydroxide. While such products are relatively effective in their ability to remove baked-on food from the interior surfaces of ovens, they are highly alkaline (i.e. having pH typically greater than about 12) and therefore present safety hazards. Fumes from such cleaner products, which are best used when the oven is warm, can irritate the eyes and throat and can also cause chemical skin burns. Moreover, the resulting product of the chemical reaction between these cleaners and baked-on food is unpleasant to handle.

Aqualytic cleaning methods, also known as steam cleaning or aqualysis, use water or steam to remove baked-on soils. In these methods, heated water (often in the form of steam) is brought into contact with the baked-on soils. Contacting the heated water to the soils for a certain amount of time facilitates separation of the soils from the interior enamel surfaces of the oven. Typically, a pool of water is placed in the oven and heated so that the water turns to steam and the steam contacts the baked-on soils.

Aqualytic cleaning presents several disadvantages. Specifically, the bottom interior surface of the oven may be completely submerged in the water during aqualytic cleaning, while the side and top interior surfaces are only contacted with steam. While this may be advantageous in removing baked-on soil from the bottom surface, baked-on soils on the side and top interior surfaces of the oven may not be fully removed from the enamel during such cleaning. In this respect, aqualytic cleaning may not satisfactorily clean the side and top interior surfaces of the oven. Furthermore, some soils, like grease, have shown particular resistance to aqualytic cleaning, even when submerged in heated water.

Additionally, for aqualytic cleaning to be effective, the enamel coating has to be specifically formulated to optimally release the baked-on food when contacted with water. Such enamel coatings will be referred to herein as "aquarelease" coatings, which are enamel coatings that satisfactorily release baked-on food when subject to water or steam. Even though aquarelease coatings may be specifically formulated to optimally release baked-on food when contacted with water, baked-on soils such as grease may still not be satisfactorily removed during aqualysis because these substances repel the water that is being used for cleaning. This may be especially true on the interior side and top oven surfaces, which are only contacted by water vapor, rather than liquid water. In this regard, it may be advantageous to subsequently use another cleaning method, e.g. pyrolytic cleaning, to completely remove water-repellant baked-on food such as grease, which may be left over after aqualytic cleaning. However, conventional aquarelease coatings are not designed to be subject to pyrolytic cleaning temperatures. If subject to temperatures of about 900° F., the conventional aquarelease coatings undesirably and substantially discolor and exhibit a loss of gloss, which is not acceptable to many oven owners.

As such, there exists a need for a composition that can be applied to the interior surfaces of oven cavities and other articles from which baked-on foods can be easily removed.

SUMMARY

The difficulties and drawbacks associated with previously known systems are addressed in the present compositions, methods, and coated substrates involving hybrid enamel cover coatings that enable baked-on foods to be easily removed.

The present subject matter relates to compositions and formulas that are used to form an enamel coating, which is a hybrid between pyrolytic release enamel and aquarelease enamel. The present subject matter provides these compositions and formulas for use in forming acid resistant and chip resistant coatings on a substrate, such as an interior surface of an oven for example. The hybrid enamel coating can define the exposed layer (e.g. top layer or cover coat) of a multi-layer coating on a substrate, or it can define a single-layer coating on a substrate. While the present hybrid enamel coatings do not require the use of highly caustic cleaners to removed baked-on food, such cleaners can be used as desired on the hybrid enamel coating without degrading the enamel coating.

The present subject matter also provides substrates coated with single or multi-layer enamels, methods for forming an enamel coating, and methods of removing baked-on soil from an enamel coating. The present hybrid coatings can be applied as the top most exposed layer by methods including one coat and one firing cycle, two or more coats (i.e. with a basecoat) with two or more firing cycles, or two or more coats with one firing cycle. The coatings can be applied by methods including spraying, dipping, or electrostatic coating.

The present methods for removing baked-on food, deposits, or soils, include the use of aqualysis, pyrolysis, or a combination of both aqualysis and pyrolysis. When pyrolysis is used to clean the enamel, and the enamel coating is subjected to typical pyrolytic temperatures, for example about 900° F. for about 60-180 minutes, the hybrid enamel coatings do not substantially lose gloss and are not undesirably discolored, such as that which occurs when conventional aquarelease coatings are subjected to these temperatures. It will also be understood that chemical cleaning can also be incorporated into the present methods.

In one aspect, the present subject matter provides a composition for use in forming an enamel cover coat from which baked-on food can be removed with aqualysis or pyrolysis, and which does not substantially discolor or lose gloss upon being in an environment heated to about 500° C. for up to about three hours. The composition comprises at least a first glass frit comprising by weight from about 5% to about 10% $Na_2O$; from about 5% to about 10% $K_2O$; from about 6% to about 15% $SiO_2$; from about 20% to about 35% $P_2O_5$; from about 10% to about 20% $ZrO_2$; from about 15% to about 25% $Al_2O_3$; from about 0% to about 6% $TiO_2$; from about 0% to about 5% $Li_2O$; from about 0% to about 8% BaO; from about 0% to about 8% $Co_2O_3$; from about 0% to about 5% $Cr_2O_3$; from about 0% to about 5% ZnO; from about 0% to about 7% CaO; from about 0% to about 7% SrO; from about 0% to about 5% F; and optionally from about 9% to about 16% $B_2O_3$.

In another aspect, the present subject matter provides a substrate having thereon a fired hybrid enamel cover coat. The cover coat comprises prior to firing, at least a first glass frit comprising by weight from about 5% to about 10% $Na_2O$; from about 5% to about 10% $K_2O$; from about 6% to about 15% $SiO_2$; from about 20% to about 35% $P_2O_5$; from about 10% to about 20% $ZrO_2$; from about 15% to about 25% $Al_2O_3$; from about 0% to about 6% $TiO_2$; from about 0% to about 5% $Li_2O$; from about 0% to about 8% BaO; from about 0% to about 7% $Co_2O_3$; from about 0% to about 5% $Cr_2O_3$; from about 0% to about 5% ZnO; from about 0% to about 7% CaO; from about 0% to about 7% SrO; from about 0% to about 5% F; and optionally from about 9% to about 16% $B_2O_3$. The cover coat allows baked-on foods to be removed from the cover coat by aqualysis or pyrolysis, and the cover coat does not substantially discolor or lose gloss upon being exposed to a temperature of about 500° C. for up to about 3 hours.

In still another aspect, the present subject matter provides a method of forming a hybrid enamel cover coat on a substrate from which baked-on food can be removed with aqualysis or pyrolysis and without requiring highly alkaline cleaners and which does not substantially discolor or lose gloss upon being in an environment heated to about 500° C. for up to about three hours. The method comprises providing a pre-fired enamel composition including at least a first glass frit comprising by weight from about 5% to about 10% $Na_2O$; from about 5% to about 10% $K_2O$; from about 6% to about 15% $SiO_2$; from about 20% to about 35% $P_2O_5$; from about 10% to about 20% $ZrO_2$; from about 15% to about 25% $Al_2O_3$; from about 0% to about 6% $TiO_2$; from about 0% to about 5% $Li_2O$; from about 0% to about 8% BaO; from about 0% to about 7% $Co_2O_3$; from about 0% to about 5% $Cr_2O_3$; from about 0% to about 5% ZnO; from about 0% to about 7% CaO; from about 0% to about 7% SrO; from about 0% to about 5% F; and optionally from about 9% to about 16% $B_2O_3$. The method includes depositing the enamel composition on a substrate. The enamel composition is fired, thereby sintering the at least first glass frit and thereby forming a hybrid enamel cover coat on the substrate.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The subject matter described herein provides hybrid pyrolytic/aqualytic enamel that can be coated on a substrate as a top most exposed cover coat or layer, and from which baked-on food can be easily removed. The sintered enamel coating is a hybrid coating. In other words, the hybrid enamel has advantageous characteristics of the each of a pyrolytic coating, an aquarelease coating, and a chemical resistant coating; and combines their attributes to form a coating that can be water cleaned, self-cleaned through pyrolysis, and/or a combination of both cleaning methods without degradation of the enamel. Additionally, although the use of highly alkaline chemical cleaners is not required to satisfactorily remove baked-on soil from the hybrid enamels, such cleaners can optionally be used on the hybrid coating and in some circumstances may not degrade the enamel. In this way, the present hybrid coating provides oven manufactures the ability to make an oven that can conform to the desires of the end user while still being an efficient coating in the manufacture of ovens.

The hybrid enamel can be cleaned with water or steam better than tradition self-cleaning pyrolytic enamels, yet can also withstand the self-cleaning pyrolytic heating cycles better than conventional aquarelease coatings. More specifically, unlike conventional aquarelease coatings, which are designed only to be cleaned with water and not by pyrolysis or with highly alkaline cleaners, the present hybrid enamel does not objectionably lose gloss or discolor when subject to temperatures of about 900° F. for about 60-180 minutes, and in some circumstances may not degrade when cleaned with highly alkaline chemical cleaners.

In several embodiments, the hybrid enamel is applied to a substrate as a single coat, i.e. without using a ground coat between the hybrid enamel and the substrate. In these embodiments, the hybrid coating only requires one coat and one firing cycle to be formed on a substrate. In other embodiments, the hybrid enamel is applied to an enamel ground coat, which itself is applied to a substrate to help bond the hybrid enamel to the substrate.

The present subject matter provides hybrid enamels that can be aqualytically cleaned using water or steam, and if any baked-on food remains after aqualysis, then also pyrolytically cleaned without degrading the enamel, such as by discoloration or loss of gloss. The enamel compositions can be applied by methods including spraying, dipping, or by electrostatic coating.

In several embodiments, the hybrid enamel is formed as an exposed top coat over a traditional pyrolytic ground coat using a single- or double-firing process. It will be understood that any ground coat that creates adequate adhesion to the substrate can be used. In one embodiment where a ground coat is used between the hybrid enamel and a substrate, the ground coat can comprise enamel that is suitable for exposure to an environment containing water. That is, the ground coat can comprise an alkali resistant ground coat.

It is understood that any ground coat, cover coat or hybrid enamel can be used as a coating on the interior of a household appliance, including, but not limited to, an oven or range. Accordingly, various embodiments of the invention include a kitchen appliance having at least a portion of a surface thereof coated with at least one of a cover coat, ground coat or hybrid enamel coating as described elsewhere herein.

Enamel Compositions

In accordance with the present subject matter, hybrid enamel coatings are formed by firing an enamel composition. The pre-fired enamel composition can be provided in the form of a dry powder or as a wet mixture, such as a water-based slurry or paste, for example.

The enamel compositions of the present subject matter comprise a glass component. The glass component includes at least a first glass frit, which sinters during the firing cycle to form the hybrid enamel coating on a substrate. In several aspects, the glass component includes two or more glass frits, e.g. a mixture of a first glass frit and a second glass frit.

When provided in the form of a dry powder, the enamel compositions are easily stored with increased shelf life, and can be applied to substrates by well known powder coating processes, such as electrostatic coating or the like. When provided as a wet mixture, such as a water-based slurry or paste, the enamel compositions can be applied by well known liquid coating processes, such as spray coating, dipping, flow coating, or screen printing, for example.

The enamel composition can be applied to a substrate, and fired to sinter the glass frit and to burn off volatile components, thereby forming the hybrid enamel coating. In one embodiment a hybrid enamel cover coat obtained by firing the enamel compositions has a Hunter L color value of less than 30. The Hunter L color value should be below 30, preferably below 25, more preferably below 20 and still more preferably below 15.

All compositional percentages disclosed herein are by weight and are given for a blend prior to firing. Numerical ranges of oxides or other ingredients that are bounded by zero on the lower end (for example, 0-7% by weight) are intended to provide support for the concept "up to [the upper limit]," for example "up to 7% SrO by weight" as well as a positive recitation that the ingredient in question is present in an amount that does not exceed the upper limit. An example of the latter is "comprises SrO, provided the amount does not exceed 10% by weight."

All ranges disclosed herein are to be understood to encompass the beginning and ending range values and any and all subranges therein. For example, a stated range of "7% to 17%" should be considered to include any and all subranges between (and inclusive of) the minimum value of 7 and the maximum value of 17; that is, all subranges beginning with a minimum value of 7 or more and ending with a maximum value of 17 or less, e.g., 7.0 to 8.7, 9.3 to 12.9, 11.7 to 17, etc.

Several details of the glass frit, pre-fired enamel compositions, fired hybrid enamel coatings, and related methods will be described in more detail below.

Glass Frit

In accordance with the present subject matter, a hybrid enamel cover coat is formed by firing an enamel composition. The pre-fired enamel composition includes, prior to firing, a glass component comprising at least a first glass frit. The enamel composition can optionally include more than one type of glass frit as desired for a particular application, for example a mixture of a first glass frit and a second glass frit. In accordance with the present subject matter, the glass frit as disclosed herein, can optionally be added to conventional enamel compositions used to form conventional pyrolytic enamels, in order to improve the aquarelease properties of the conventional pyrolytic enamels.

Glass frit can be produced by firing a mixture of different oxides, which are melted and mixed at high temperatures to form a molten mixture of oxides. Raw materials used to obtain oxides can often contain carbonates ($CO_3$) and nitrates that will decompose and during firing. In addition, compounds containing fluorine (F) can also be added to the mixture of different oxides and included in the molten mixture of oxides. The molten material is then quenched to form an amorphous solid glass. In several embodiments, the amorphous glass is modified, such as by milling or grinding, to form glass frit of a desired average particle size, typically about 1-50 µm, about 3-30 µm, or about 3-20 µm. In one aspect, the glass component includes a mixture of different glass frits, each with average particle sizes within 1-50 µm.

During grinding to size the glass frit, conventional milling techniques can be employed and certain additives can be added to adjust the properties of the glass frit, the pre-fired enamel composition, or the fired hybrid enamel. Milling fineness is not critical, but a fineness of about 2 grams being retained from a 50 gram sample using a 200 mesh sieve is acceptable. Other particle size distributions may also be utilized. After milling, it may be desired to subject the milled pre-fired enamel composition to a post milling heat treatment, such as exposure to temperatures of about 200° F. (93° C.) or more for about 18 hours or more. More broadly, the heat treatment may be undertaken after firing, and may be carried out at 70° F. to 500° F. (25° C. to 260° C.) for 1 to 50 hours, preferably 2 to 25 hours.

Typical and preferred ranges for glass frit are set forth below in Table 1 as follows (all values are in weight percent unless indicated otherwise).

TABLE 1

Glass Frit Formulation Ranges

| Component | Preferred | Typical |
|---|---|---|
| $Na_2O$ | 5.2-9.7 | 5-10 |
| $K_2O$ | 1.5-8.5 | 1-10 |
| $SiO_2$ | 8.0-23.6 | 6-25 |
| $P_2O_5$ | 16.9-35.0 | 15-35 |
| $ZrO_2$ | 0-20.0 | 0-20 |
| $Al_2O_3$ | 11.9-22.0 | 10-25 |
| $TiO_2$ | 0-4.0 | 0-6 |
| $Li_2O$ | 0-2.0 | 0-5 |
| BaO | 0.1-5.0 | 0-8 |
| $Co_2O_3$ | 0-5.0 | 0-7 |
| $Cr_2O_3$ | 0-1.0 | 0-5 |
| ZnO | 0-1.5 | 0-5 |
| CaO | 0-5.0 | 0-7 |
| SrO | 0-5.0 | 0-7 |
| F | 0.1-3.0 | 0-5 |
| optionally $B_2O_3$ | 5.6-16.7 | 5-20 |

The glass frit formulations can include additional oxides including from about 0-0.2% MgO; about 0-2.1% SnO; about 1.1-1.6% $Co_3O_4$, about 0.1-1.3% $Fe_2O_3$, or about 2.0-2.1% $Co_3O_4+Fe_2O_3$; about 0-0.9% CuO; about 0.2-1.9% MnO; about 0-1.3% $CeO_2$; about 0-1.0% $Sb_2O_3$; about 0-0.2% $MoO_3$; and about 0-2.8% $NO_2$.

The present subject matter provides several preferred compositions set forth below in Table 2. These preferred compositions are designated as preferred compositions A, B, and C.

TABLE 2

Glass Frit Preferred Compositions

| Component | Preferred Composition A | Preferred Composition B | Preferred Composition C |
|---|---|---|---|
| $Na_2O$ | 6.3-7.4 | 6.5-8.5 | 5.2-9.7 |
| $K_2O$ | 6.3-7.4 | 6.5-8.5 | 1.5-7.0 |
| $SiO_2$ | 9.9-11.9 | 8.0-13.5 | 21.0-23.7 |
| $P_2O_5$ | 25.7-29.7 | 27.0-35.0 | 16.9-24.1 |
| $ZrO_2$ | 12.7-14.7 | 12.0-20.0 | 0-6.8 |
| $Al_2O_3$ | 16.8-20.8 | 18.0-22.0 | 11.9-20.7 |
| $TiO_2$ | 0.6-4.0 | — | 0-2.1 |
| $Li_2O$ | 0.3-0.5 | — | 0.3-2.1 |
| BaO | 0.7-0.8 | 3.0-3.5 | 2.1-7.5 |
| $Co_2O_3$ | 1.4-1.6 | — | — |
| $Cr_2O_3$ | — | — | — |
| ZnO | — | 0.7-0.9 | — |
| CaO | — | — | 0-1.8 |
| SrO | — | — | 0-6.0 |
| F | 1.0-2.0 | 1.0-1.2 | 0.4-2.0 |
| $B_2O_3$ | 10.3-14.3 | — | 5.6-16.7 |
| MgO | — | — | 0-0.2 |
| SnO | — | — | 0-2.1 |
| $Co_3O_4$ | — | — | 1.1-1.6 |
| $Fe_2O_3$ | — | — | 0.1-1.3 |
| CuO | — | — | 0-0.9 |
| MnO | — | — | 0.2-1.9 |
| $CeO_2$ | — | — | 0-1.3 |
| $Sb_2O_3$ | — | — | 0-1.0 |
| $MoO_3$ | — | — | 0-0.2 |
| $NO_2$ | — | — | 0-2.8 |

In one embodiment, the glass frit comprises by weight and prior to firing:
from about 5% to about 10% $Na_2O$;
from about 1% to about 10% $K_2O$;
from about 6% to about 25% $SiO_2$;
from about 15% to about 35% $P_2O_5$;
from about 0% to about 20% $ZrO_2$;
from about 10% to about 25% $Al_2O_3$;
from about 0% to about 6% $TiO_2$;
from about 0% to about 5% $Li_2O$;
from about 0% to about 8% BaO;
from about 0% to about 7% $Co_2O_3$;
from about 0% to about 5% $Cr_2O_3$;
from about 0% to about 5% ZnO;
from about 0% to about 7% CaO;
from about 0% to about 7% SrO;
from about 0% to about 5% F; and
optionally from about 5% to about 20% $B_2O_3$.

In another embodiment, the glass frit comprises by weight and prior to firing:
from about 6.3% to about 7.4% $Na_2O$;
from about 6.3% to about 7.4% $K_2O$;
from about 10.3% to about 14.3% $B_2O_3$;
from about 9.9% to about 11.9% $SiO_2$;
from about 25.7% to about 29.7% $P_2O_5$;
from about 12.7% to about 14.7% $ZrO_2$;
from about 16.8% to about 20.8% $Al_2O_3$;
from about 0.6% to about 4.0% $TiO_2$;
from about 0.1% to about 2.0% $Li_2O$;
from about 0.1% to about 2.0% BaO;
from about 0.1% to about 5.0% $Co_2O_3$;
from about 0.1% to about 1.0% $Cr_2O_3$; and
from about 0.1% to about 3.0% F.

In another embodiment, the glass frit comprises by weight and prior to firing:
from about 6.5% to about 8.5% $Na_2O$;
from about 6.5% to about 8.5% $K_2O$;
from about 8.0% to about 13.5% $SiO_2$;
from about 27.0% to about 35.0% $P_2O_5$;
from about 12.0% to about 20.0% $ZrO_2$;
from about 18.0% to about 22.0% $Al_2O_3$;
from about 0.1% to about 1.5% ZnO;
from about 0.1% to about 5.0% BaO;
from about 0% to about 5.0% CaO;
from about 0% to about 5.0% SrO; and
from about 0.1% to about 3.0% F.

In another embodiment, the glass frit comprises by weight and prior to firing:
from about 5.2% to about 9.7% $Na_2O$;
from about 1.5% to about 7.0% $K_2O$;
from about 21.0% to about 23.7% $SiO_2$;
from about 16.9% to about 24.1% $P_2O_5$;
from about 0% to about 6.8% $ZrO_2$;
from about 11.9% to about 20.7% $Al_2O_3$;
from about 0% to about 2.1% $TiO_2$;
from about 0.3% to about 2.1% $Li_2O$;
from about 2.1% to about 7.5% BaO;
from about 0% to about 1.8% CaO;
from about 0% to about 6.0% SrO;
from about 0.4% to about 2.0% F;
from about 5.6% to about 16.7% $B_2O_3$;
from about 0% to about 0.2% MgO;
from about 0% to about 2.1% SnO;
from about 1.1% to about 1.6% $Co_3O_4$;
from about 0.1% to about 1.3% $Fe_2O_3$;
from about 0% to about 0.9% CuO;
from about 0.2% to about 1.9% MnO;
from about 0% to about 1.3% $CeO_2$;
from about 0% to about 1.0% $Sb_2O_3$;

from about 0% to about 0.2% $MoO_3$; and
from about 0% to about 2.8% $NO_2$.

By using these oxides within these particular ranges, the glass frit can be included in an enamel composition, which when fired forms a hybrid enamel coating that can be cleaned using aqualytic cleaning methods, pyrolytic cleaning methods, or a combination thereof. The use of pyrolysis to clean these hybrid enamel coatings will not objectionably discolor the enamel or degrade the gloss thereof. Further, the enamel coating formed by such a frit does not require the use of highly alkaline cleaners to remove the baked-on food.

Vehicle

In several embodiments, the glass frit can be included in an enamel composition that is in the form of a liquid-based mixture, for example a slurry or paste. These wet mixtures can include a liquid vehicle, which can comprise water, solvent, or a combination thereof. The solvent can comprise organic or inorganic solvents, and polar or non-polar solvents including alcohols, glycols, ethers, alkanes, or the like.

The vehicle can also include a binder dissolved or dispersed in the water and/or solvent. The binder can include any saccharides and their derivatives, proteins such as gelatin, natural or synthetic polymers, or a combination thereof.

Additives

To prepare the enamel compositions, the various components can be added together and mixed, for example in a ball mill. Components to be included in the enamel compositions will vary depending on the whether the enamel composition will be in dry powder or wet mixture form, and will also depend on the coating technique that will be used to apply the composition to a substrate.

In this respect, the glass frit(s) can be mixed along with one or more additives to form the pre-fired enamel composition. The additives are not particularly limited by the present subject matter, and can be included at up to about 20% or more by weight of the pre-fired enamel composition.

Suitable additives include, for example, one or more of each of clay, bentonite, magnesium carbonate, potassium carbonate or other carbonates, nitrates (e.g. potassium nitrate), nitrites (e.g. potassium nitrite), pigments, dyes, phosphors, sodium aluminate, boric acid, pigments, inorganic materials (such as zirconia, alumina, alumina metaphosphate, aluminum phosphate, spodumene, and feldspar in order to modify the texture and/or to adjust the roughness of the fired enamel), siloxane (such as organopolysiloxane), glass flecks (such as white glass flecks), a cobalt containing material selected from the group consisting of cobalt oxide (e.g. $CoO$, $Co_2O_3$, $Co_3O_4$, $LiCoO_2$), cobalt containing pigment (e.g. $CoAl_2O_4$), or a combination thereof, surfactant, adhesion promoting agents, filler, binder, rheological additives, or the like as desired for a particular application, or combinations thereof.

When the enamel composition is in wet form, such as a slurry or paste, the enamel composition can further comprise a liquid vehicle or carrier that may include a dissolved or dispersed binder resin as previously described.

After mixing the various components of the pre-fired enamel composition, for example by milling, it may be desirable to subject the enamel composition to a post milling heat treatment such as exposure to temperatures of about 200° F. (93° C.) or more, for about 18 hours or more.

Combinations

The present subject matter includes combinations of various substrates comprising a hybrid enamel coating. The hybrid enamel coating defines an exposed surface, such as a top coat or cover coat on the substrate. The substrate is not particularly limited by the present subject matter and can comprise any material to which the enamel composition can be applied, fired, and adequately bonded. The substrate can comprise for example, metal, glass, ceramic, stone, or a combination thereof. Furthermore, the substrate may include a ground coat applied directly to the substrate, which may be positioned between the hybrid enamel cover coat and the substrate to act as an adhesion layer between the hybrid enamel and the substrate.

In one embodiment, the substrate comprises at least a portion of an oven, particularly an interior metal surface of an oven, on which soil from cooking food may be deposited and baked on. Other substrates and configuration may be used in conjunction with the present hybrid enamel coating.

Methods

The glass frit can be included in an enamel composition and fired to form a hybrid enamel cover coat on a substrate. The pre-fired enamel compositions are applied as cover coat enamels for use on sheet steel or other substrates. For example, the compositions can be applied directly onto pickled, nickel-coated steel. The compositions can be applied over fired enamel ground coated substrates using known two-coat/two-fire processes. The compositions can be applied over unfired ground coats using any of the known two-coat/one-fire processes (e.g., wet/wet, wet/dry, and dry/dry).

The pre-fired enamel compositions according to the present subject matter can be applied by any of the known wet application processes such as spraying, dipping, flow coating, and electrodeposition. The application rate of the enamel compositions to a substrate by wet application processes will vary depending upon the desired thickness of the resulting fired hybrid enamel cover coat. For example, a fired hybrid enamel cover coat having a thickness of about 140 μm can be obtained when the application rate of the wet enamel composition is about 400 $g/m^2$.

In several embodiments, the enamel compositions are dried prior to firing in order to remove any liquid portion of the enamel composition and any other volatile components. Drying is typically accomplished using drying ovens. The drying time and temperature are not critical, and can be similar to conventional enamels, so long as the liquid portion and any other volatile components of the enamel are sufficiently removed.

The enamel compositions can also be applied using conventional dry application processes, including electrostatic spraying methods. In such instances, one or more additives, such as siloxane or organopolysiloxane for example, may be added to the enamel compositions to facilitate electrostatic application. The application rate of the compositions by dry electrostatic processes will vary widely according to the desired thickness of the resultant hybrid enamel cover coat. Typical application rates for dry powder enamel composition can range from about 200 $g/m^2$ to about 600 $g/m^2$.

Once the enamel compositions according to the present subject matter are deposited on a substrate in dry form, they are typically fired at temperatures ranging anywhere from about 770° C. to about 870° C. for about 2 to about 8 minutes. Such firing temperatures and durations operate to sinter the glass frit in the composition, thus forming a hybrid enamel coating on the substrate. In one aspect, the enamel compositions are fired at a temperature of from about 800° C. to about 850° C. for about 3 to about 6 minutes, or about 840° C. for about 4.5 minutes. It will be appreciated that firing times and temperatures are not critical, and a range of firing schedules could be used.

In one embodiment, the hybrid enamel is formed directly on the surface of a substrate, i.e. without using a ground coat to bond the hybrid enamel to the substrate. This system is referred to herein as a one-coat or single-coat system, wherein a single coating of pre-fired enamel composition is applied to, and fired directly on a substrate to form a hybrid enamel cover coat.

In accordance with the present subject matter, multilayer enamel coated substrates are also provided. In one embodiment, a substrate receives an enamel ground coat and then also receives a hybrid enamel cover coat as described herein. The ground coat is preferably disposed between and in contact with the substrate and the hybrid enamel cover coat. However, it will be appreciated that the present subject matter includes a wide array of other configurations.

In one aspect, the hybrid enamel is included as part of a two-coat system, wherein the hybrid enamel defines a top exposed cover coat over a ground coat. The ground coat is used to bond the hybrid enamel to the substrate. In this two-coat system, the ground coat is positioned between the hybrid enamel and the substrate, and the hybrid enamel defines an exposed surface.

The ground coat enamel is not particularly limited and can include any enamel composition capable of adequately bonding the hybrid enamel to the substrate. Suitable ground coat enamels can comprise those known for use as pyrolytic ground coats, such as those disclosed in U.S. Pat. No. 8,778,455 to Benford et al., the subject matter of which is incorporated herein by reference.

The ground coat compositions, like the pre-fired hybrid enamel cover coat compositions, can also be applied using conventional wet or dry applications methods, for example dry electrostatic application processes. In such dry applications processes, one or more additives are typically added to the compositions to facilitate electrostatic application, such as a polysiloxane. The application rate for the compositions by dry electrostatic coating processes will vary widely according to the desired thickness of the resultant ground coat.

The ground coat compositions according to the present subject matter are typically fired according to practices known in the art. It will be appreciated that firing times and temperatures are not critical, and a range of firing schedules could be used.

In a two-coat system, a pre-fired hybrid enamel composition as described herein can be applied over a fired ground coat enamel, or over a ground coat enamel composition that has not been fired. If applied over a fired ground coat enamel, the pre-fired hybrid enamel composition will be fired to thereby form the hybrid enamel cover coat over the already formed and fired ground coat enamel. This method is referred to herein as a two-coat/two-fire method, wherein each of the two pre-fired enamel composition is deposited and fired separately from the other pre-fired enamel composition.

If applied over a ground coat enamel composition that has not been fired, then both the pre-fired hybrid enamel composition and the pre-fired ground coat enamel composition will be fired together at the same time to thereby respectively form the hybrid enamel and the ground coat enamel. This method is referred to herein as a two-coat/one-fire method, wherein the two pre-fired enamel compositions are separately deposited on the substrate, but are fired at the same time.

When utilized in conjunction with one another, and with optional other enamel layers, the ground coat and the enamel cover coat can be applied, dried, and fired in a variety of different strategies. For example, a ground coat and an enamel cover coat can be applied via a two-coat/two-fire dry process in which a dry ground coat is applied and then fired, followed by application of a dry enamel cover coat to the fired ground coat. The enamel cover coat is then fired. Another method involves a two-coat/two-fire wet/wet process in which a wet ground coat is applied, dried, and then fired. A wet enamel cover coat is then applied onto the fired ground coat, dried, and then fired.

Yet another process is referred to as a two-coat/one-fire wet/dry process involving application of a wet ground coat, drying and then application of a dry enamel cover coat on the dried ground coat. The resulting layers are then collectively fired. A two-coat/one-fire dry process can be used in which a dry ground coat is applied and then a dry enamel cover coat is applied onto the unfired ground coat. The two layers are then collectively fired. In still another technique, referred to as a two-coat/one-fire wet/wet process, a wet ground coat is applied followed by application of a wet enamel coat onto the wet ground coat. Thereafter, a single firing is performed on both wet coats.

Upon firing and subsequent cooling, the enamel compositions according to the present subject matter thus form hybrid enamels defining an exposed cover coat on a substrate. Thus formed, these hybrid enamel cover coats can be cleaned by using pyrolytic and/or aqualytic cleaning methods as desired. The pyrolytic and aqualytic cleaning methods are able to completely remove baked-on foods from the hybrid enamel coating without the use of highly alkaline cleaners. Nevertheless, highly alkaline cleaners can be used on the hybrid enamel and in some circumstances may not degrade the enamel. Furthermore, the hybrid enamel coating can be subjected to pyrolytic temperatures around 500° C. for several hours, yet not discolor or lose gloss like conventional aqualytic enamels when exposed to such temperatures and for such duration.

The enamel compositions according to the subject matter are particularly well-suited for application on the interior surfaces of oven cavities, dripping pans, cookware, grates, burner caps, cooking pans, grill parts, and other articles that are exposed to the risk of baked-on food soiling. The compositions can also be applied and fired to other surfaces, such as surfaces of microwave ovens for example. The fired hybrid enamel cover coats can be produced in a wide range of colors, including bright colors such as blue, red, and green, by varying the pigments included as additives or as mill additions.

The fired hybrid cover coat enamels according to the present subject matter are scratch resistant, stain resistant, and maintain their easy-to-clean properties over many pyrolytic and aqualytic cleaning cycles. In addition, baked-on food can be easily removed from the hybrid cover coat enamels without having to use highly alkaline chemical cleaners. That is, all or most baked-on foods will be removed from the hybrid enamel cover coats by aqualytic cleaning using heated water. Such aqualytic cleaning can be used on a regular basis, and which would require less energy and time than regularly using pyrolytic cleaning. If there happens to be any remaining bake-on food after aqualysis, then a subsequent aqualytic and/or pyrolytic cleaning operation(s) can be used to fully clean the hybrid enamel, wherein the enamel does not undesirably discolor or lose gloss during pyrolytic cleaning.

In operation, pyrolytic cleaning, which requires more energy and time than aqualytic cleaning, does not have to be used every time cleaning is required or desired, and can thus be used less frequently and reserved especially for hard-toclean baked-on soil. This cleaning regimen, which primarily relies on aqualytic cleaning and reserves the use of pyrolytic cleaning, can result in reduced cleaning costs compared to cleaning of conventional pyrolytic enamel coatings only by pyrolysis (which is more expensive to perform than aqualytic cleaning).

Furthermore, when only aqualysis is used to clean conventional aquarelease enamel, hard-to-remove baked-on soil may not be fully removed. Because pyrolysis will discolor and reduce the gloss of these conventional aquarelease enamels, cleaning of such hard-to-remove baked-on soil may necessitate using highly alkaline cleaners. Such highly alkaline cleaners are caustic and objectionable to some users, and are not required to fully clean the present hybrid enamels.

In one embodiment, there is provided a method of cleaning hybrid enamels having baked-on food residue, wherein the baked-on residue is exposed to warm water (e.g. water vapor) having a temperature of at least 130° F. (54° C.) to about 212° F. (100° C.), about 140-160° F. (60-71° C.), or about 150° F. (66° C.). The baked-on soil can also be exposed to liquid water, which is preferably heated to the noted temperatures for the noted time periods. After such exposure, the food or food residue can be easily cleaned off the hybrid enamel by wiping, rubbing, or scrubbing. As noted, cleaning efforts do not require the use of harsh or caustic cleaning agents.

When the hybrid enamels are formed on an interior surface of an oven, this aqualytic cleaning may be accomplished by putting water in the oven and heating the oven to about 200° F. to about 250° F. for about 20-60 minutes, or for about 30 minutes.

If the baked-on soils are not completely removed by aqualysis, pyrolytic cleaning can be used to remove the soils, after which the charred material can be easily removed. In this instance, a substrate including the hybrid enamel can be placed in an environment heated to a temperature of about 900° F. to about 930° F., or more for about 60-180 minutes, wherein the hybrid coating does not substantially discolor or lose gloss during such heating.

EXAMPLES

In order to further assess the various aspects and benefits of the present subject matter, a series of investigations were undertaken to evaluate the hybrid enamel compositions. In the several examples, the weight percentage (wt %) of the various components may add up to be more or less than 100 wt %. It will be understood that the recited weight percentages for the various components, whether more, less, or equal to 100 wt %, indicate the relative amount of each component.

Example 1: One-Coat/One-Fire Application

A glass frit according to the preferred Composition A from Table 2 was milled into an electrostatic powder as shown below in Table 3. This powder is designated as "Powder Enamel 1."

TABLE 3

| Formulation of Powder Enamel 1 | |
| --- | --- |
| Raw Material | Powder Enamel 1 |
| Frit A | 98 wt % |
| Cobalt Containing Material | 1.5 wt % |
| Siloxane | 0.24 wt % |

TABLE 3-continued

| Formulation of Powder Enamel 1 | |
| --- | --- |
| Raw Material | Powder Enamel 1 |
| White fleck glass frit | 2.0 wt. % |
| Fineness | 2% on 200M Sieve |
| Screening | 60 or 100 mesh |
| Post Milling Heat Treatment | 300° F. (149° C.) |

The electrostatic spray powder was applied directly to a steel substrate at 4-5 mils thickness and fired for 4.5 minutes at 1545° F. (841° C.) without using a ground coat.

Examples 2-3: Two-Coat/Two-Fire Application

A colored glass frit according to the preferred Composition B from Table 2 was milled into an electrostatic powder as shown below in Table 4. This powder is designated as "Powder Enamel 2."

TABLE 4

| Formulation of Powder Enamel 2 | |
| --- | --- |
| Raw Material | Powder Enamel 2 |
| Frit B | 100 wt % |
| Blue or Red Pigment | 2.5 wt % |
| Siloxane | 0.24 wt % |
| Fineness | 18-20% on 325M Sieve |
| Screening | 100 mesh |
| Post Milling Heat Treatment | 300° F. (149° C.) |

Example 2 had a blue pigment and Example 3 had a red pigment in the formulation for Powder Enamel 2. Both examples were applied as top coats at 4-5 mils thickness directly on fired ground coats on steel substrates. The top coats were fired for 4.5 minutes at 1550° F. (843° C.).

Examples 4-6: Hybrid Enamel Coatings

Three hybrid enamel coatings were prepared for analysis. A colored glass frit according to the preferred Composition B from Table 2 was milled into an electrostatic powder as shown below in Table 5. This powder is designated as "Powder Enamel 3."

TABLE 5

| Formulation of Powder Enamel 3 | |
| --- | --- |
| Raw Material | Powder Enamel 3 |
| Frit B | 100 wt % |
| Pigment | 2.5 wt % |
| Siloxane | 0.25 wt % |
| White fleck glass frit | 2 wt. % |
| Fineness | 10-30% on 325 M Sieve |
| Screening | 60 or 100 mesh |
| Post Milling Heat Treatment | 300° F. (149° C.) |

Example 4 included a turquoise blue pigment of CoCrAl in the Powder Enamel 3. Example 4 was prepared by a two-coat/two-fire dry electrostatic process and applied as a top coat directly on a powder pyrolytic ground coat, which was previously fired and cooled on a steel substrate. The ground coat is PL100 groundcoat, which is commercially available from Ferro Corporation, Cleveland, Ohio. The top coat was applied at 4-6 mils thickness and fired for 4 minutes at 1550° F. (843° C.). Example 4 fired out into an enamel-covered test plate having a smooth glossy turquoise blue finish free from defects.

Example 5 included a red pigment of iron oxide in the Powder Enamel 3. Example 5 was prepared by a two-coat/two-fire dry electrostatic process and applied as a top coat directly on a powder pyrolytic ground coat, which was previously fired and cooled on a steel substrate. The ground coat is PL100 groundcoat, which is commercially available from Ferro Corporation, Cleveland, Ohio. The top coat was applied at 4-6 mils thickness and fired for 4 minutes at 1550° F. (843° C.). Example 5 fired out into an enamel-covered test plate having a smooth glossy red finish free from defects.

Example 6 included a blue pigment of CoSi in the Powder Enamel 3. Example 6 was prepared by a one-coat/one-fire dry electrostatic process directly on a steel substrate. The powder was applied at 4-6 mils thickness and fired for 4 minutes at 1540° F. (838° C.). Example 6 fired out into an enamel-covered test plate having a smooth glossy blue finish free from defects.

Examples 4-6 were evaluated using three different test procedures against commercially available pre-fired enamel compositions, which are listed as comparative examples 7-9 and used as reference standards.

Comparative Examples 7-9

Comparative Example 7 is a test plate prepared by firing PL100 groundcoat, which is a powdered pyrolytic enamel composition that is commercially available from Ferro Corporation, Cleveland, Ohio. The pyrolytic enamel composition was fired and cooled on a steel substrate without an enamel ground coat. The enamel composition was applied at 4-6 mils thickness and fired for 4 minutes at 1550° F. (843° C.).

Comparative Example 8 is a test plate prepared by firing RM195-A, which is a wet aquarelease enamel composition that is commercially available from Ferro Corporation, Cleveland, Ohio. The wet aquarelease enamel composition was applied at 4-6 mils thickness and fired for 4 minutes at 1510° F. (821° C.) and cooled over a conventional wet pyrolytic ground coat enamel, RM49E, which was applied at 4-6 mils thickness and fired for 4 minutes at 1550° F. (843° C.) on a steel substrate and which is an enamel composition that is commercially available from Ferro Corporation, Cleveland, Ohio.

Comparative Example 9 is a test plate prepared by firing PG703 enamel composition, which is a powdered aquarelease enamel composition that is commercially available from Ferro Corporation, Cleveland, Ohio. The aquarelease enamel composition was applied at 4-6 mils thickness and fired for 4 minutes at 1545° F. (841° C.) and cooled over a ground coat enamel, PL100, which was applied at 4-6 mils thickness and fired for 4 minutes at 1550° F. (843° C.) on a steel substrate.

Cleanability and durability of Examples 4-6 and Comparative Examples 7-9 were evaluated.

In a first testing procedure, the aquarelease cleanability of the enamel coatings was evaluated. Six foodstuffs to be tested for aquarelease were prepared as follows:
1. AHAM mixture
2. Cherry pie filling
3. Lemon juice
4. Beef gravy
5. Ketchup
6. Egg whites (or egg beaters)

The recipe for the AHAM mixture is shown below in Table 6.

TABLE 6

| AHAM Mixture Recipe | | |
|---|---|---|
| AHAM Mixture | U.S. | Metric |
| 75% Lean ground beef | 4 oz. | 113 g |
| Grated cheddar cheese | ½ cup | 119 mL |
| Whole milk | ½ cup | 119 mL |
| Granulated white sugar | ½ cup | 119 mL |
| Canned sour pie cherries | ½ cup | 119 mL |
| Dry, uncooked instant tapioca pudding mix | 2 tbsp. | 30 mL |
| Large raw egg | 1 | 1 |
| All-purpose flour | 2 tbsp. | 30 mL |
| Tomato juice | ½ cup | 119 mL |

In order to bake on the above foodstuffs 1-6, the example panels were placed in a conventional free-standing electric range that was then preheated to 450° F. (232° C.). Second, the oven was turned off, and 0.5 teaspoon (2.5 ml) of each of the above noted foodstuffs 1-6 was applied to the enamel-coated panels. Next, the soils were baked onto the enamels at 450° F. (232° C.) for 1 hour. The oven was allowed to cool for 15 minutes.

The baked-on soiled panels were evaluated by submerging them in water, which was heated to 140° F. (60° C.) for 30 minutes and allowed to cool for 30 minutes.

Using a Scotch-Brite scouring sponge that is suitable for glass surfaces, it was first attempted to remove all the soils with a light rub. After evaluating and recording, the attempt was changed to a hard rub to finalize scoring. Each enamel received a score for each type of baked-on soil according to the rating system shown below in Table 7.

TABLE 7

| Rating System Per Soil | |
|---|---|
| Force and Residue | Score |
| Light Rub Full Cleaning | 5 |
| Light Rub Some Residue | 4 |
| Hard Rub Full Cleaning | 3 |
| Hard Rub Some Residue | 2 |
| Ingredients Can't Be Removed | 0 |

The score for each soil was summed and the totals were assigned ratings according to the criteria in Table 8.

TABLE 8

| Cleanability Ratings | |
|---|---|
| Cleanability Score | Class |
| 25-30 | A |
| 20-24 | B |
| 15-19 | C |
| 10-14 | D |
| 0-9 | E |

The enamel-coated panels were also evaluated for spalling (flaking or chipping) and staining of the enamel.

The results of aquarelease cleanability of Examples 4-9 are provided below in Table 9. Unless noted otherwise, there was no spalling or staining observed for the enamel coatings.

TABLE 9

Aquarelease Cleanability of Examples 4-6 and Comparative Examples 7-9

| | Hybrid Enamels | | | Comparative Examples | | |
|---|---|---|---|---|---|---|
| Soil | Ex. 4: Turquoise/Blue 2 coat | Ex. 5: Red 2 coat | Ex. 6: Blue 1 coat | Ex. 7 Pyro. | Ex. 8 Wet Aq. Rel. | Ex. 9 Dry Aq. Rel. |
| AHAM | 2 | 2 | 2 | 2 | 5 | 2 |
| Cherry Pie Filling | 3 | 4 | 4-spall | 2 | 5-spall | 4-spall |
| Lemon Juice | 5 | 5 | 5 | 4 | 5 | 5 |
| Beef Gravy | 4 | 4 | 4 | 4 | 4 | 4 |
| Ketchup | 3 | 4 | 4-spall | 2 | 5 | 4 |
| Egg Whites | 5 | 5 | 5 | 2 | 5 | 5 |
| Total Score | 22 | 24 | 24 | 16 | 29 | 24 |
| Rating | B | B | B | C | A | B |

As is evident from the data in Table 9, the hybrid enamel coatings of Examples 4-6, especially those applied over a ground coat, performed about as well as the aquarelease coatings of Examples 8-9. Furthermore, hybrid Examples 4-5 did not exhibit spalling, unlike aquarelease Examples 8-9. The pyrolytic coating of Example 7 did not perform well in this aquarelease cleanability evaluation and displayed some residue even after light or hard rubbing.

A coating prepared from a hybrid enamel powder exhibited significantly better aquarelease cleanability characteristics as compared to a standard self-cleaning pyrolytic coating.

In a second testing procedure, spalling and staining of the enamel coatings was evaluated after being subject to a pyrolytic cleaning cycle. Six foodstuffs to be tested for pyrolysis were prepared as follows:

1. AHAM mixture
2. Cherry pie filling
3. Cranberry sauce
4. Pineapple preserves
5. Milk
6. Egg whites The recipe for the AHAM mixture is as listed in Table 6 above. In order to bake on the above foodstuffs 1-6, a second group of new panels for each of Examples 4-9 was prepared and the foodstuffs were applied thereto as previously described for the aquarelease testing.

The second group of new panels of Examples 4-9 were evaluated by placing the panels in an oven, which was heated to 800-900° F. (427-482° C.) for 3 hours, which is a conventional temperature schedule used in pyrolytic cycles for self-cleaning ovens.

In all of the examples the baked-on soil was incinerated on the enamel surface; leaving only a carbon powder, which was easily wiped away. Each enamel was then evaluated for spalling and staining. The results of the evaluation after pyrolytic cleaning of the new panels of Examples 4-9 are provided below in Table 10.

TABLE 10

Spalling and Staining of Examples 4-6 and Comparative Examples 7-9 After Pyrolytic Cycle

| | Hybrid Enamels | | | Comparative Examples | | |
|---|---|---|---|---|---|---|
| Soil | Ex. 4: Turquois/Blue 2 coat | Ex. 5: Red 2 coat | Ex. 6: Blue 1 coat | Ex. 7 Pyro. | Ex. 8 Wet Aq. Rel. | Ex. 9 Dry Aq. Rel. |
| AHAM | no spall, slight stain | no spall, slight stain | No spall, Moderate stain | Slight stain, No spall | Heavy spall, No stain | No spall, Slight stain |
| Cherry Pie Filling | slight spall, no stain | slight spall, no stain | Slight spall, No stain | Slight spall, No stain | Heavy spall, No stain | Slight spall, No stain |
| Cranberry sauce | moderate spall, no stain | Moderate spall, No stain | Moderate spall, No stain | Moderate spall, No stain | Heavy spall, No stain | Moderate spall, No stain |
| Pineapple preserves | moderate spall, no stain | Slight spall, No stain | Slight spall, No stain | Slight spall, No stain | Moderate spall, No stain | Slight spall, No stain |
| Milk | no spall, slight stain | No spall, Slight stain | No spall, Slight stain | No spall, Slight stain | No spall, Moderate stain | No spall, Slight stain |
| Egg Whites | No spall, Slight stain | No spall, Slight stain | No spall, Moderate stain | No spall, Slight stain | No spall, Moderate stain | No spall, Slight stain |

As can be seen from Table 10, after being subject to a pyrolytic cleaning cycle, the hybrid enamels of Examples 4-6 performed as well as the conventional pyrolytic enamel of Example 7 with respect to spalling and staining of the enamel, and much better than the aquarelease coating of Example 8, which showed heavy spalling or moderate staining after the pyrolytic cleaning cycle.

In a third testing procedure, the long-term pyrolytic durability of the enamel coatings was evaluated for discoloration and loss of gloss after subjecting the enamels to a simulated pyrolytic accelerated-life test. With respect to discoloration, a delta E of 2 or greater was considered failing. For this evaluation, a third group of new panels for each of Examples 4-9 was prepared.

The third group of panels of Examples 4-9 was evaluated by placing the panels in an oven heated to 1,000° F. (538° C.) for 72 hours. Each enamel coating was then evaluated for gloss and color, and compared to the original gloss and color of the enamel before testing. The goal for the enamel coating is to retain the original gloss and color so that the enamel looks like it did when originally applied to the steel panel.

The enamels were each graded as passing or failing, wherein a passing grade indicates no significant change to the gloss and color, and a failing grade indicates an undesirable and significant change to the gloss and color of the enamel. The results of the evaluation after accelerated pyrolytic testing are provided below in Table 11.

TABLE 11

Retention of Gloss and Color of Examples 4-6 and Comparative Examples 7-9

| | Hybrid Enamels | | | Comparative Examples | |
|---|---|---|---|---|---|
| | Ex. 4: Turquois/Blue 2 coat | Ex. 5: Red 2 coat | Ex. 6: Blue 1 coat | Ex. 7 Pyro. | Ex. 8 Wet Aq. Rel. | Ex. 9 Dry Aq. Rel. |
| Grade | Pass | Pass | Pass | Pass | Fail | Fail |

As is evident from the data in Table 11, the hybrid enamel coatings of Examples 4-6 did not show significant loss of gloss or discoloration. In this regard, Examples 4-6 performed as well as the conventional pyrolytic coating of Example 7, and better than the aquarelease coatings of Examples 8-9, which showed significant loss of gloss and discoloration when subject to long term pyrolytic durability testing.

With respect to Example 9, Table 11 makes clear that despite showing acceptably low levels of staining and spalling when subject to one pyrolytic cleaning cycle, Example 9 nevertheless showed significant loss of gloss and discoloration after a simulated pyrolytic life-cycle and thus would not be acceptable for use in a self-cleaning pyrolytic oven.

As demonstrated by the above results, enamel coatings in accordance with the present subject matter are truly "hybrid" coatings in that they performed as well as a conventional pyrolytic enamel coating when subject to a pyrolytic cleaning cycle and when subject to long-term pyrolytic durability testing, and out-performed conventional aquarelease coating in these same tests. Furthermore, the hybrid enamels performed as well as conventional aquarelease coatings when subject to aqualytic cleaning, and out-performed conventional pyrolytic enamel coatings in the same test.

Other aspects of the invention are detailed herein by the following Items:

Item 1: A composition for forming an enamel cover coat from which baked-on food can be removed with aqualysis or pyrolysis and which does not substantially discolor or lose gloss upon being in an environment heated to about 500° C. for up to about three hours, the composition comprising at least a first glass frit comprising by weight:
from about 5% to about 10% $Na_2O$;
from about 1% to about 10% $K_2O$;
from about 6% to about 25% $SiO_2$;
from about 15% to about 35% $P_2O_5$;
from about 0% to about 20% $ZrO_2$;
from about 10% to about 25% $Al_2O_3$;
from about 0% to about 6% $TiO_2$;
from about 0% to about 5% $Li_2O$;
from about 0% to about 8% BaO;
from about 0% to about 7% $Co_2O_3$;
from about 0% to about 5% $Cr_2O_3$;
from about 0% to about 5% ZnO;
from about 0% to about 7% CaO;
from about 0% to about 7% SrO;
from about 0% to about 5% F; and
optionally from about 5% to about 20% $B_2O_3$.

Item 2: The composition according to item 1, wherein the first glass frit comprises by weight:
from about 6.3% to about 7.4% $Na_2O$;
from about 6.3% to about 7.4% $K_2O$;
from about 10.3% to about 14.3% $B_2O_3$;
from about 9.9% to about 11.9% $SiO_2$;
from about 25.7% to about 29.7% $P_2O_5$;
from about 12.7% to about 14.7% $ZrO_2$;
from about 16.8% to about 20.8% $Al_2O_3$;
from about 0.6% to about 4.0% $TiO_2$;
from about 0.1% to about 2.0% $Li_2O$;
from about 0.1% to about 2.0% BaO;
from about 0.1% to about 5.0% $Co_2O_3$;
from about 0.1% to about 1.0% $Cr_2O_3$; and
from about 0.1% to about 3.0% F.

Item 3: The composition according to item 2, further comprising a cobalt containing material selected from the group consisting of cobalt oxide, cobalt containing pigment, or a combination thereof.

Item 4: The composition according to item 1, wherein the first glass frit comprises by weight:
from about 6.5% to about 8.5% $Na_2O$;
from about 6.5% to about 8.5% $K_2O$;
from about 8.0% to about 13.5% $SiO_2$;
from about 27.0% to about 35.0% $P_2O_5$;
from about 12.0% to about 20.0% $ZrO_2$;
from about 18.0% to about 22.0% $Al_2O_3$;
from about 0.1% to about 1.5% ZnO;
from about 0.1% to about 5.0% BaO;
from about 0% to about 5.0% CaO;
from about 0% to about 5.0% SrO; and
from about 0.1% to about 3.0% F.

Item 5: The composition according to item 1, wherein the first glass frit comprises by weight:
from about 5.2% to about 9.7% $Na_2O$;
from about 1.5% to about 7.0% $K_2O$;
from about 21.0% to about 23.7% $SiO_2$;
from about 16.9% to about 24.1% $P_2O_5$;
from about 0% to about 6.8% $ZrO_2$;
from about 11.9% to about 20.7% $Al_2O_3$;
from about 0% to about 2.1% $TiO_2$;
from about 0.3% to about 2.1% $Li_2O$;
from about 2.1% to about 7.5% BaO;
from about 0% to about 1.8% CaO;
from about 0% to about 6.0% SrO;
from about 0.4% to about 2.0% F;
from about 5.6% to about 16.7% $B_2O_3$;
from about 0% to about 0.2% MgO;
from about 0% to about 2.1% SnO;
from about 1.1% to about 1.6% $Co_3O_4$;
from about 0.1% to about 1.3% $Fe_2O_3$;
from about 0% to about 0.9% CuO;
from about 0.2% to about 1.9% MnO;
from about 0% to about 1.3% $CeO_2$;
from about 0% to about 1.0% $Sb_2O_3$;
from about 0% to about 0.2% $MoO_3$; and
from about 0% to about 2.8% $NO_2$.

Item 6: The composition according to item 1, further comprising by weight from about 0.1% to about 5.0% pigment.

Item 7: The composition according to item 1, further comprising a second glass frit blended with the first glass frit.

Item 8: The composition according to item 1, further comprising by weight a siloxane from about 0.1% to about 3.0%.

Item 9: The composition of item 1, wherein upon firing the composition produces an enamel cover coat having a Hunter L color value of less than 30.

Item 10: A substrate having thereon a fired hybrid enamel cover coat, the cover coat comprising prior to firing, at least a first glass frit comprising by weight:
from about 5% to about 10% $Na_2O$;
from about 1% to about 10% $K_2O$;
from about 6% to about 25% $SiO_2$;
from about 15% to about 35% $P_2O_5$;
from about 0% to about 20% $ZrO_2$;
from about 10% to about 25% $Al_2O_3$;
from about 0% to about 6% $TiO_2$;
from about 0% to about 5% $Li_2O$;
from about 0% to about 8% BaO;
from about 0% to about 7% $Co_2O_3$;
from about 0% to about 5% $Cr_2O_3$;
from about 0% to about 5% ZnO;
from about 0% to about 7% CaO;
from about 0% to about 7% SrO;
from about 0% to about 5% F; and
optionally from about 5% to about 20% $B_2O_3$;
wherein baked-on foods can be removed from the cover coat by aqualysis or pyrolysis, and the cover coat does not substantially discolor or lose gloss upon being exposed to a temperature of about 500° C. for up to about 3 hours.

Item 11: The substrate according to item 10, wherein the first glass frit comprises by weight:
from about 6.3% to about 7.4% $Na_2O$;
from about 6.3% to about 7.4% $K_2O$;
from about 10.3% to about 14.3% $B_2O_3$;
from about 9.9% to about 11.9% $SiO_2$;
from about 25.7% to about 29.7% $P_2O_5$;
from about 12.7% to about 14.7% $ZrO_2$;
from about 16.8% to about 20.8% $Al_2O_3$;
from about 0.6% to about 4.0% $TiO_2$;
from about 0.1% to about 2.0% $Li_2O$;
from about 0.1% to about 2.0% BaO;
from about 0.1% to about 5.0% $Co_2O_3$;
from about 0.1% to about 1.0% $Cr_2O_3$; and
from about 0.1% to about 3.0% F.

Item 12: The substrate according to item 11, further comprising a cobalt containing material selected from the group consisting of cobalt oxide, cobalt containing pigment, or a combination thereof.

Item 13: The substrate according to item 12, wherein the cover coat is directly in contact with the surface of the substrate without having a ground coat between the cover coat and the surface of the substrate.

Item 14: The composition according to item 10, wherein the first glass frit comprises by weight:
from about 6.5% to about 8.5% $Na_2O$;
from about 6.5% to about 8.5% $K_2O$;
from about 8.0% to about 13.5% $SiO_2$;
from about 27.0% to about 35.0% $P_2O_5$;
from about 12.0% to about 20.0% $ZrO_2$;
from about 18.0% to about 22.0% $Al_2O_3$;
from about 0.1% to about 1.5% ZnO;
from about 0.1% to about 5.0% BaO;
from about 0% to about 5.0% CaO;
from about 0% to about 5.0% SrO; and
from about 0.1% to about 3.0% F.

Item 15: The composition according to item 10, wherein the first glass frit comprises by weight:
from about 5.2% to about 9.7% $Na_2O$;
from about 1.5% to about 7.0% $K_2O$;
from about 21.0% to about 23.7% $SiO_2$;
from about 16.9% to about 24.1% $P_2O_5$;
from about 0% to about 6.8% $ZrO_2$;
from about 11.9% to about 20.7% $Al_2O_3$;
from about 0% to about 2.1% $TiO_2$;
from about 0.3% to about 2.1% $Li_2O$;
from about 2.1% to about 7.5% BaO;
from about 0% to about 1.8% CaO;
from about 0% to about 6.0% SrO;
from about 0.4% to about 2.0% F;
from about 5.6% to about 16.7% $B_2O_3$;
from about 0% to about 0.2% MgO;
from about 0% to about 2.1% SnO;
from about 1.1% to about 1.6% $Co_3O_4$;
from about 0.1% to about 1.3% $Fe_2O_3$;
from about 0% to about 0.9% CuO;
from about 0.2% to about 1.9% MnO;
from about 0% to about 1.3% $CeO_2$;
from about 0% to about 1.0% $Sb_2O_3$;
from about 0% to about 0.2% $MoO_3$; and
from about 0% to about 2.8% $NO_2$.

Item 16: The substrate of item 14, further including an enamel ground coat positioned between the cover coat and a surface of the substrate.

Item 17: The substrate of item 10, wherein the substrate comprises an interior surface of an oven.

Item 18: The substrate of item 10, wherein the cover coat further includes prior to firing, a second glass frit blended with the first glass frit.

Item 19: A method of forming a hybrid enamel cover coat on a substrate from which baked-on food can be removed with aqualysis or pyrolysis and without requiring highly alkaline cleaners and which does not substantially discolor or lose gloss upon being in an environment heated to about 500° C. for up to about three hours, the method comprising:
providing a pre-fired enamel composition including at least a first glass frit comprising by weight:
from about 5% to about 10% $Na_2O$;
from about 5% to about 10% $K_2O$;
from about 6% to about 15% $SiO_2$;
from about 20% to about 35% $P_2O_5$;
from about 10% to about 20% $ZrO_2$;
from about 15% to about 25% $Al_2O_3$;
from about 0% to about 6% $TiO_2$;
from about 0% to about 5% $Li_2O$;
from about 0% to about 8% BaO;
from about 0% to about 7% $Co_2O_3$;
from about 0% to about 5% $Cr_2O_3$;
from about 0% to about 5% ZnO;
from about 0% to about 7% CaO;
from about 0% to about 7% SrO;
from about 0% to about 5% F; and
optionally from about 9% to about 16% $B_2O_3$;
depositing the enamel composition on a substrate, and firing the enamel composition thereby sintering the at least first glass frit and thereby forming a hybrid enamel cover coat on the substrate.

Item 20: The method of item 19, wherein the first glass frit comprises by weight:
from about 6.3% to about 7.4% $Na_2O$;
from about 6.3% to about 7.4% $K_2O$;

from about 10.3% to about 14.3% $B_2O_3$;
from about 9.9% to about 11.9% $SiO_2$;
from about 25.7% to about 29.7% $P_2O_5$;
from about 12.7% to about 14.7% $ZrO_2$;
from about 16.8% to about 20.8% $Al_2O_3$;
from about 0.6% to about 4.0% $TiO_2$;
from about 0.1% to about 2.0% $Li_2O$;
from about 0.1% to about 2.0% BaO;
from about 0.1% to about 5.0% $Co_2O_3$;
from about 0.1% to about 1.0% $Cr_2O_3$; and
from about 0.1% to about 3.0% F.

Item 21: The method of item 20, wherein the pre-fired enamel composition further comprising a cobalt containing material selected from the group consisting of cobalt oxide, cobalt containing pigment, or a combination thereof.

Item 22: The method of item 21, wherein the enamel composition is applied directly to the surface of the substrate.

Item 23: The method of item 19, wherein the first glass frit comprises by weight:
from about 6.5% to about 8.5% $Na_2O$;
from about 6.5% to about 8.5% $K_2O$;
from about 8.0% to about 13.5% $SiO_2$;
from about 27.0% to about 35.0% $P_2O_5$;
from about 12.0% to about 20.0% $ZrO_2$;
from about 18.0% to about 22.0% $Al_2O_3$;
from about 0.1% to about 1.5% ZnO;
from about 0.1% to about 5.0% BaO;
from about 0% to about 5.0% CaO;
from about 0% to about 5.0% SrO; and
from about 0.1% to about 3.0% F.

Item 24: The method of item 19, wherein the first glass frit comprises by weight:
from about 5.2% to about 9.7% $Na_2O$;
from about 1.5% to about 7.0% $K_2O$;
from about 21.0% to about 23.7% $SiO_2$;
from about 16.9% to about 24.1% $P_2O_5$;
from about 0% to about 6.8% $ZrO_2$;
from about 11.9% to about 20.7% $Al_2O_3$;
from about 0% to about 2.1% $TiO_2$;
from about 0.3% to about 2.1% $Li_2O$;
from about 2.1% to about 7.5% BaO;
from about 0% to about 1.8% CaO;
from about 0% to about 6.0% SrO;
from about 0.4% to about 2.0% F;
from about 5.6% to about 16.7% $B_2O_3$;
from about 0% to about 0.2% MgO;
from about 0% to about 2.1% SnO;
from about 1.1% to about 1.6% $Co_3O_4$;
from about 0.1% to about 1.3% $Fe_2O_3$;
from about 0% to about 0.9% CuO;
from about 0.2% to about 1.9% MnO;
from about 0% to about 1.3% $CeO_2$;
from about 0% to about 1.0% $Sb_2O_3$;
from about 0% to about 0.2% $MoO_3$; and
from about 0% to about 2.8% $NO_2$.

Item 25: The method of item 23, wherein an enamel ground coat is positioned between the cover coat and a surface of the substrate.

Item 26: The method of item 23, wherein the pre-fired enamel composition further comprises by weight from about 0.1% to about 5.0% pigment.

Item 27: The method of item 19, wherein the enamel composition further includes a polysiloxane and is in dry form, and the enamel composition is electrostatically deposited on the substrate.

Item 28: The method of item 19, further comprising providing a ground coat composition, depositing the ground coat composition on the substrate, and firing the ground coat composition to thereby form a ground coat enamel on the substrate.

Item 29: The method of item 27, wherein the ground coat composition and the enamel composition are fired together.

Item 30: The method of item 27, wherein a ground coat enamel is positioned between the hybrid enamel cover coat and the substrate.

Item 31: The method of item 19, wherein the enamel composition includes a second glass frit blended with the first glass frit.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. A composition for forming an enamel cover coat, the composition comprising at least a first glass frit comprising by weight:
from about 6.3% to about 7.4% $Na_2O$;
from about 6.3% to about 7.4% $K_2O$;
from about 9.9% to about 11.9% $SiO_2$;
from about 25.7% to about 29.7% $P_2O_5$;
from about 12.7% to about 14.7% $ZrO_2$;
from about 16.8% to about 20.8% $Al_2O_3$;
from about 0.6% to about 4.0% $TiO_2$;
from about 0.1% to about 2.0% $Li_2O$;
from about 0.1% to about 2.0% BaO;
from about 0.1% to about 5.0% $Co_2O_3$;
from about 0.1% to about 1.0% $Cr_2O_3$;
from about 10.3% to about 14.3% $B_2O_3$; and
from about 0.1% to about 3.0% F.

2. The composition according to claim 1, further comprising a cobalt containing material selected from the group consisting of cobalt oxide, cobalt containing pigment, and a combination thereof.

3. A composition for forming an enamel cover coat, the composition comprising at least a first glass frit comprising by weight:
from about 5.2% to about 9.7% $Na_2O$;
from about 1.5% to about 7.0% $K_2O$;
from about 21.0% to about 23.7% $SiO_2$;
from about 16.9% to about 24.1% $P_2O_5$;
from about 0% to about 6.8% $ZrO_2$;
from about 11.9% to about 20.7% $Al_2O_3$;
from about 0% to about 2.1% $TiO_2$;
from about 0.3% to about 2.1% $Li_2O$;
from about 2.1% to about 7.5% BaO;
from about 0% to about 1.8% CaO;

from about 0% to about 6.0% SrO;
from about 0.4% to about 2.0% F;
from about 5.6% to about 16.7% $B_2O_3$;
from about 0% to about 0.2% MgO;
from about 0% to about 2.1% SnO;
from about 1.1% to about 1.6% $Co_3O_4$;
from about 0.1% to about 1.3% $Fe_2O_3$;
from about 0% to about 0.9% CuO;
from about 0.2% to about 1.9% MnO;
from about 0% to about 1.3% $CeO_2$;
from about 0% to about 1.0% $Sb_2O_3$;
from about 0% to about 0.2% $MoO_3$; and
from about 0% to about 2.8% $NO_2$.

4. A substrate having thereon a fired hybrid enamel cover coat, the cover coat comprising prior to firing, at least a first glass frit comprising by weight:
from about 6.3% to about 7.4% $Na_2O$;
from about 6.3% to about 7.4% $K_2O$;
from about 9.9% to about 11.9% $SiO_2$;
from about 25.7% to about 29.7% $P_2O_5$;
from about 12.7% to about 14.7% $ZrO_2$;
from about 16.8% to about 20.8% $Al_2O_3$;
from about 0.6% to about 4.0% $TiO_2$;
from about 0.1% to about 2.0% $Li_2O$;
from about 0.1% to about 2.0% BaO;
from about 0.1% to about 5.0% $Co_2O_3$;
from about 0.1% to about 1.0% $Cr_2O_3$;
from about 10.3% to about 14.3% $B_2O_3$; and
from about 0.1% to about 3.0% F.

5. The substrate according to claim 4, further comprising a cobalt containing material selected from the group consisting of cobalt oxide, cobalt containing pigment, and a combination thereof.

6. A substrate having thereon a fired hybrid enamel cover coat, the cover coat comprising prior to firing, at least the composition according to claim 3.

7. The substrate of claim 6, wherein the substrate comprises an interior surface of an oven.

8. The substrate of claim 6, wherein the cover coat further includes prior to firing, a second glass frit blended with the first glass frit.

9. A method of forming a hybrid enamel cover coat on a substrate from which baked-on food can be removed with aqualysis or pyrolysis and without requiring highly alkaline cleaners, the method comprising:
providing a pre-fired enamel composition including at least the composition according to claim 1,
depositing the enamel composition on a substrate, and
firing the enamel composition thereby sintering the at least first glass frit and thereby forming a hybrid enamel cover coat on the substrate.

10. A method of forming a hybrid enamel cover coat on a substrate from which baked-on food can be removed with aqualysis or pyrolysis and without requiring highly alkaline cleaners, the method comprising:
providing a pre-fired enamel composition including at least the composition according to claim 3,
depositing the enamel composition on a substrate, and
firing the enamel composition thereby sintering the pre-fired enamel composition and thereby forming a hybrid enamel cover coat on the substrate.

11. The method of claim 10, further comprising providing a ground coat composition, depositing the ground coat composition on the substrate, and firing the ground coat composition to thereby form a ground coat enamel on the substrate.

12. A household appliance including a surface that is at least partially coated with the enamel cover coat formed by firing the composition of claim 1.

13. A household appliance including the substrate of claim 6.

* * * * *